(12) United States Patent
Katsuyama et al.

(10) Patent No.: US 10,532,845 B2
(45) Date of Patent: Jan. 14, 2020

(54) SEALING DEVICE

(71) Applicant: GENERAL PACKER CO., LTD., Aichi (JP)

(72) Inventors: Kei Katsuyama, Aichi (JP); Naoyuki Kuniyoshi, Aichi (JP); Yuki Miyabe, Aichi (JP)

(73) Assignee: GENERAL PACKER CO., LTD., Aichi (JP)

( * ) Notice: Subject to any disclaimer, the term of this patent is extended or adjusted under 35 U.S.C. 154(b) by 599 days.

(21) Appl. No.: 15/364,606

(22) Filed: Nov. 30, 2016

(65) Prior Publication Data

US 2018/0148208 A1    May 31, 2018

(51) Int. Cl.
| | | |
|---|---|---|
| *B65B 51/00* | (2006.01) | |
| *B65B 65/02* | (2006.01) | |
| *B65B 59/00* | (2006.01) | |
| *B65B 51/14* | (2006.01) | |
| *B29C 65/00* | (2006.01) | |

(52) U.S. Cl.
CPC ............ *B65B 65/02* (2013.01); *B29C 65/00* (2013.01); *B65B 51/146* (2013.01); *B65B 59/00* (2013.01)

(58) Field of Classification Search
CPC ....... B29C 65/00; B29C 65/08; B65B 51/146; B65B 51/225
See application file for complete search history.

(56) References Cited

U.S. PATENT DOCUMENTS

| | | | | | |
|---|---|---|---|---|---|
| 5,881,539 | A | * | 3/1999 | Fukuda | .................. B65B 9/213 53/374.5 |
| 6,138,442 | A | * | 10/2000 | Howard | .................. B65B 51/30 53/373.7 |

(Continued)

FOREIGN PATENT DOCUMENTS

| | | | | |
|---|---|---|---|---|
| EP | 0115538 A1 | * | 8/1984 | ................ G01P 1/02 |
| JP | 2002046713 A | | 2/2002 | |
| JP | 2006193176 A | | 7/2006 | |

OTHER PUBLICATIONS

Notification of Reasons for Refusal for Japanese Patent App. No. 2014-126082 dated Nov. 1, 2017 with English language translation thereof.

*Primary Examiner* — Andrew M Tecco
*Assistant Examiner* — Eyamindae C Jallow
(74) *Attorney, Agent, or Firm* — Cermak Nakajima & McGowan LLP; Tomoko Nakajima

(57) ABSTRACT

A sealing device incorporated in a packaging machine heat-seals a vicinity of a bag mouth of a packaging bag. Paired heater bars are disposed opposite each other so as to be openable/closable and hold the vicinity between them when closed, thereby heat-sealing the vicinity. A link mechanism converts rotation of an output shaft of a servomotor to an opening/closing operation of the heater bars. A storage unit stores seal patterns, each of which includes a sealing pressure applied to the parts and a sealing time period for which the parts are continuously held. A selection unit is configured to select one seal pattern. The output shaft is rotated by a predetermined closing angle according to the sealing pressure of the selected seal pattern to close the heater bars. The heater bars are maintained in the closed state for the sealing time period of the selected seal pattern.

2 Claims, 11 Drawing Sheets

(56) References Cited

U.S. PATENT DOCUMENTS

| | | | | |
|---|---|---|---|---|
| 7,171,795 | B2 * | 2/2007 | Kondo | B29C 65/18 53/329.4 |
| 7,546,722 | B2 * | 6/2009 | Tsuruta | B29C 65/18 53/375.3 |
| 2002/0162305 | A1 * | 11/2002 | Miyamoto | B65B 51/306 53/551 |
| 2005/0155331 | A1 * | 7/2005 | Matheyka | B65B 51/30 53/479 |
| 2008/0066430 | A1 * | 3/2008 | Lubezny | B29C 65/18 53/451 |
| 2010/0281822 | A1 * | 11/2010 | Murray | B65B 39/02 53/64 |
| 2016/0354974 | A1 * | 12/2016 | Wang | B29C 66/92611 |
| 2016/0368202 | A1 * | 12/2016 | Crites | B29C 65/08 |

* cited by examiner

SEALING DEVICE

BACKGROUND

1. Technical Field

The present disclosure relates to a sealing device which is incorporated in a packaging machine filling a packaging bag with articles and which heat-seals a vicinity of a bag mouth of the packaging bag.

2. Related Art

Rotary type packaging machines have conventionally been known which fill packaging bags with articles comprising grain, pelleted dog food or like powder and granular material. One of the conventional rotary type packaging machines includes a plurality of devices which are in charge of respective steps of feeding packaging bags, opening the packaging bags, filling the packaging bags with granular material, shaping the packaging bags and sealing the packaging bags. In the step of sealing the packaging bags, a sealing device is used which welds a vicinity of a bag mouth of the packaging bag thereby to heat-seal the vicinity of the bag mouth of the packaging bag, whereby the sealing device can closely seal the packaging bag filled with the articles.

A conventional sealing device 100 as illustrated in FIG. 11 includes a pair of cantilevers 102 having heater bars 101 opposed to each other while a part of a packaging bag located in the vicinity of a bag mouth of the packaging bag is interposed therebetween, a cam (not illustrated) connected to a main shaft of a rotary 2, a slider 103 following the cam thereby to be moved upward and downward along a slider guide 104, and link units 105 connecting the slider 103 and the cantilevers 102 to each other thereby to convert the up-down motion of the slider 103 to an opening/closing operation of the cantilever. As a result, when the slider 103 is moved downward, the heater bars 101 are closed to hold and heat-seal the vicinity of the bag mouth of the packaging bag.

However, when one type of packaging bag used with the packaging machine is changed to another type of packaging bag, a pressure of a compression spring needs to be adjusted to fine adjust a sliding range of the slider, a stop position of the slider, an opening/closing angle of the cantilevers and the like, with the result that an assembling work or maintenance check of the sealing device is difficult and troublesome. Furthermore, since the heater bars are mechanically opened/closed in synchronization with rotation of the main shaft of the rotary in the conventional sealing device, it is difficult to detect defective biting of the heater bars. The defective biting has a possibility of occurrence of shortage in a sealing pressure the heater bars apply to the packaging bag or a sealing time period in the conventional sealing devices, with the result of sealing defect. Adversely, an excessively high sealing pressure or prolonged sealing time period has a possibility of burning the vicinity of the bag mouth of the packaging bag.

Japanese Patent Application Publication No. JP-A-2012-250756 discloses a bar heater device including a pair of heater bars, a servomotor and a link mechanism connecting the heater bars and the servomotor to each other, whereby defective biting of the heater bars during the closing operation is detected on the basis of variations in an amount of rotation or in the torque of the servomotor. Thus, the defective biting can be detected without use of a sensor.

In the above-described conventional bar heater device, however, a clearance between the heater bars is increased during the closing operation so that variations in an amount of rotation or the torque of the servomotor are detected, whereby the defective biting is detected. More specifically, since the heater bars are strongly biased against the packaging bag simultaneously when the defective biting is detected, there is a possibility that the packaging bag would be burned.

Furthermore, a force spreading out the heater bars is detected against the closing operation of the heater bars. Accordingly, for example, when a packaging bag made of a thinner sheet is changed to another packaging bag made of a thicker sheet in the packaging machine, an increase in the thickness of the sheet would erroneously be regarded as spreading out the heater bars, with the result that the defective biting would be detected. In view of this drawback, an amount of rotation or torque needs to have a certain range in order that the defective biting may be prevented from erroneous detection by the change in the packaging bag. However, when the difference between the thicknesses of the packaging bags is extremely large, there is still a possibility that the extreme thickness would exceed the range of an amount of rotation or torque, with the result that the same time and effort as in the conventional sealing device are required for readjustment of the range.

SUMMARY

Therefore, an object of the present disclosure is to provide a sealing device which can heat-seal the packaging bags with an optimum sealing pressure and sealing time period according to a type of the packaging bag.

The present disclosure provides a sealing device which is incorporated in a packaging machine filling a packaging bag with articles and which heat-seals a vicinity of a bag mouth of the packaging bag. The sealing device includes a pair of heater bars, a servomotor, a link mechanism, a storage unit, a selection unit, and a control unit. The paired heater bars are disposed opposite each other so as to be openable/closable. The heater bars hold the vicinity of the bag mouth of the packaging bag when closed, thereby heat-sealing the vicinity of the bag mouth of the packaging bag. The servomotor has an output shaft rotatable forward/backward. The link mechanism connects the servomotor and the heater bars to each other to convert rotation of the output shaft to an opening/closing operation of the heater bars. The storage unit stores a plurality of seal patterns, each of which includes a sealing pressure applied to the vicinity of the bag mouth of the packaging bag when the of the bag mouth in the packaging bag is held between the heater bars and a sealing time period for which the vicinity of the bag mouth of the packaging bag is continuously held between the heater bars. The seal patterns include different sealing pressures and different sealing time periods for every one of a plurality of types of the packaging bags. The selection unit is configured to select one of the seal patterns stored by the storage unit. The control unit is configured to control so that the output shaft is rotated by a predetermined closing angle according to the predetermined sealing pressure of the seal pattern selected by the selection unit thereby to close the heater bars, and so that the heater bars are maintained in the closed state for the predetermined sealing time period of the selected seal pattern.

According to the above-described sealing device, each of the seal patterns is formed by combining the sealing pressure applied to the vicinity of the bag mouth of the packaging bag when the vicinity of the bag mouth of the packaging bag is held between the heater bars and the sealing time period for which the vicinity of the bag mouth of the packaging bag is continuously held between the heater bars. When one of the seal patterns is selected, the output shaft of the servomotor is rotated by the predetermined angle according to the sealing pressure of the selected seal pattern so that the heater bars are closed. The heater bars are maintained in the closed state for the sealing time period of the selected seal pattern. As a result, the packaging bag can be heat-sealed by the paired heater bars with selection of the optimum sealing pressure and sealing time period according to the type of the packaging bag.

When one of the seal patterns is selected, the output shaft of the servomotor is rotated by the predetermined rotation angle. This can reduce working hours of assembling of the sealing device or working hours of maintenance check of the sealing device.

Furthermore, since the output shaft is rotated by the predetermined angle according to the predetermined sealing pressure, influences of differences in operators' knacks can be excluded in the installation or the maintenance check of the sealing device, with the result that the installation or maintenance check can easily be carried out.

DETAILED DESCRIPTION

Figure 1:
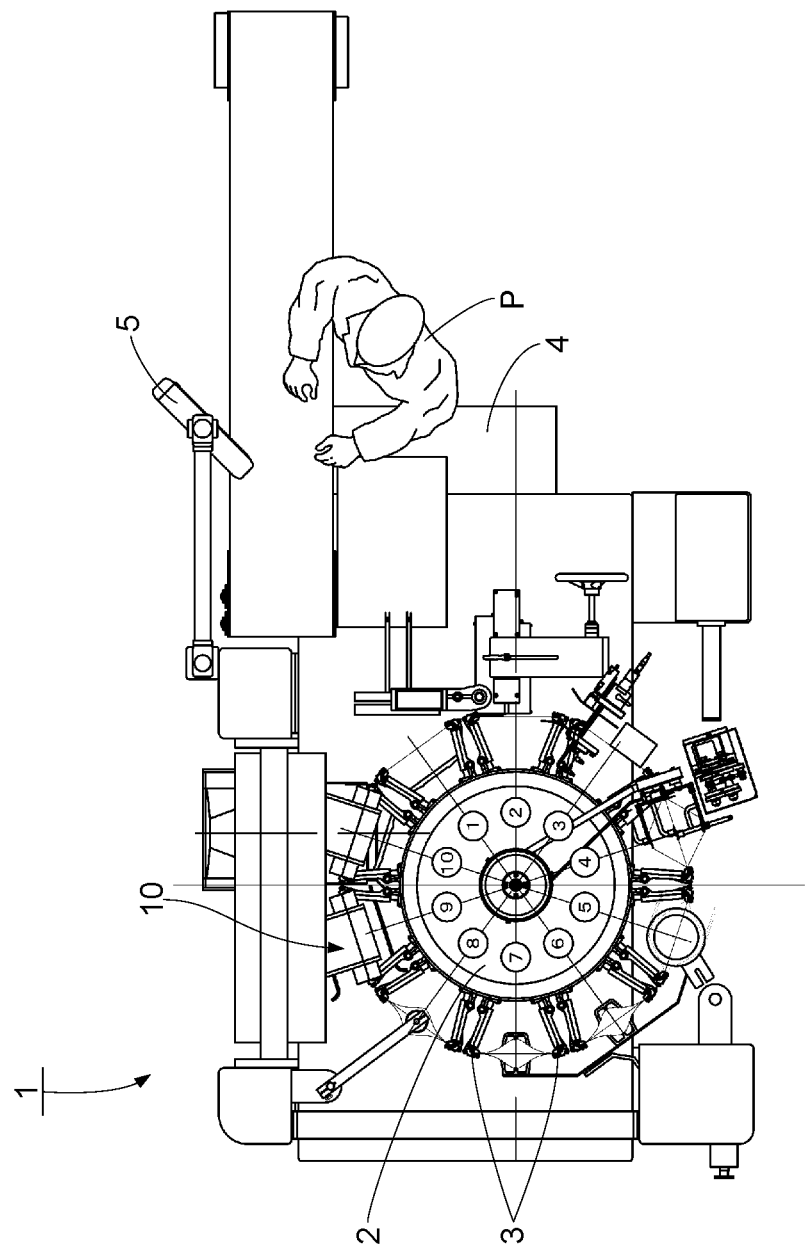
FIG. 1 is a schematic plan view of a packaging machine in which a sealing device according to one embodiment is incorporated.

One embodiment will be described with reference to FIGS. 1 to 10 of the accompanying drawings. Referring to FIG. 1, an overall construction of a rotary type packaging machine 1 in which a sealing device 10 according to the embodiment is incorporated is schematically illustrated. The rotary type packaging machine 1 includes a rotary 2 rotated at a predetermined rotating speed. A plurality of grips 3 which holds a packaging bag is mounted on the rotary 2. The packaging machine 1 is configured to sequentially carry out:

a first step of holding a packaging bag by the grips 3 (a bag feeding step);

a second step of opening a chuck of the packaging bag (a chuck opening step) and printing on the packaging bag signs or bar codes indicative of manufacturing date and manufacturing plant or identification marks similar to the signs or bar codes (a printing step);

a third step of checking and certifying the printed identification marks (a checking/certifying step);

a fourth step of opening the packaging bag (an opening step);

a fifth step of filling the packaging bag with articles (a filling step);

the fifth to seventh steps of applying vibration to the bottom of the packaging bag (a vibrating step);

an eighth step of pushing the articles into the bag (a pushing step) and of blowing off the articles adherent to the opening of the packaging bag (a blowing step);

a ninth step of sealing the opening (a top sealing step) while deflating the packaging bag (a deflating step); and a tenth step of cooling the vicinity of the sealed opening (a cooling step) and detaching the packaging bag from the grips and discharging the packaging bag (a product discharging step).

The packaging machine 1 carries out the above-mentioned steps while the grips 3 are moved along the circumference of the rotary 2 substantially one turn. As a result, the packaging machine 1 can fill the packaging bags with the articles with the space being conserved. Furthermore, the packaging machine 1 can shorten the traffic line of a worker since the first or bag feeding step is adjacent to the tenth or product discharging step, with the result that the working efficiency can be improved.

A plurality of devices is incorporated in the packaging machine 1 to have charge of the respective steps. The sealing device 10 according to the embodiment has charge of the ninth step (the top sealing step) and the tenth step (the cooling step).

Figure 2:
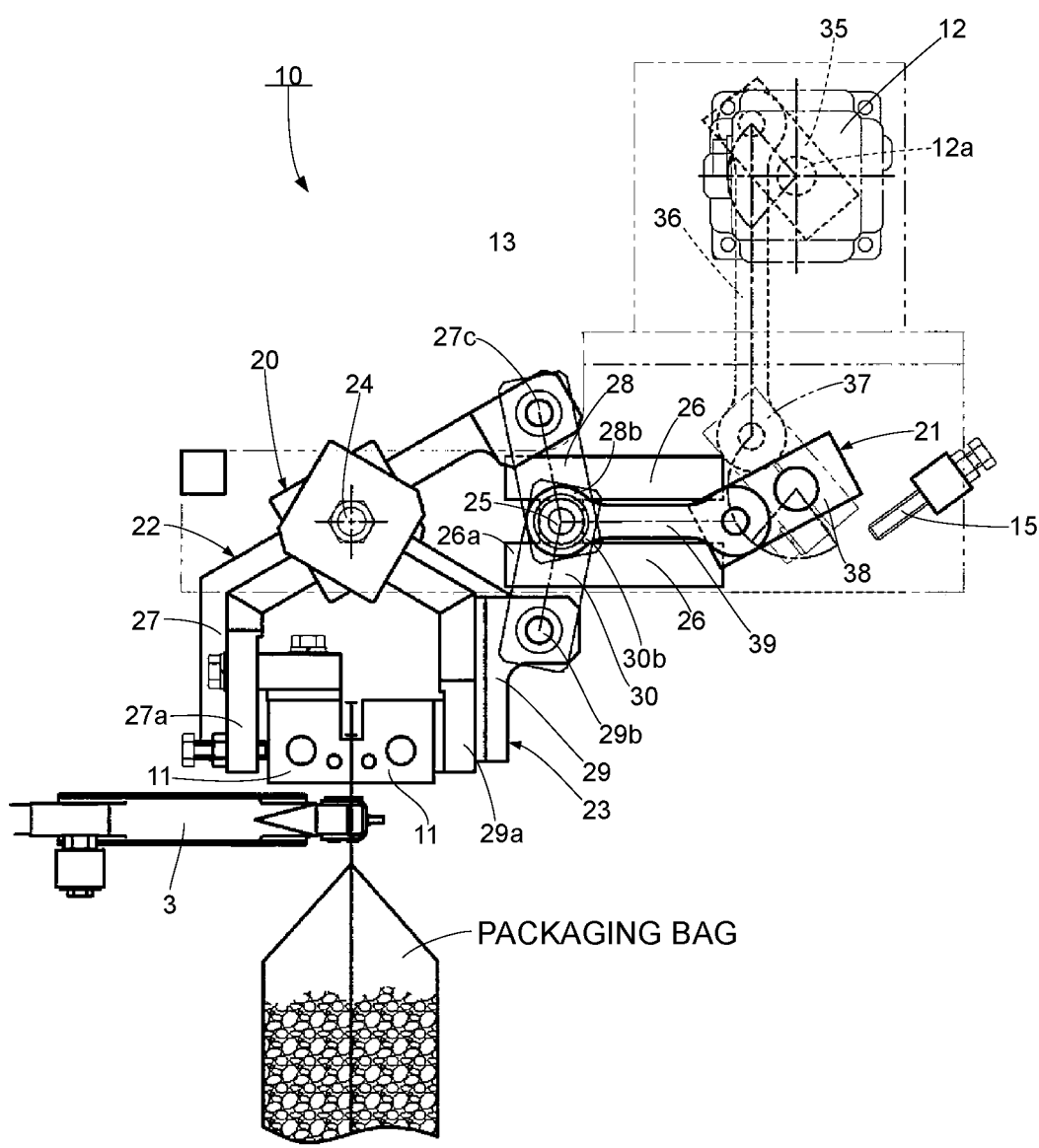
FIG. 2 is a schematic side elevation of the sealing device, illustrating the construction of the device in the case where heater bars are closed.
Figure 3:
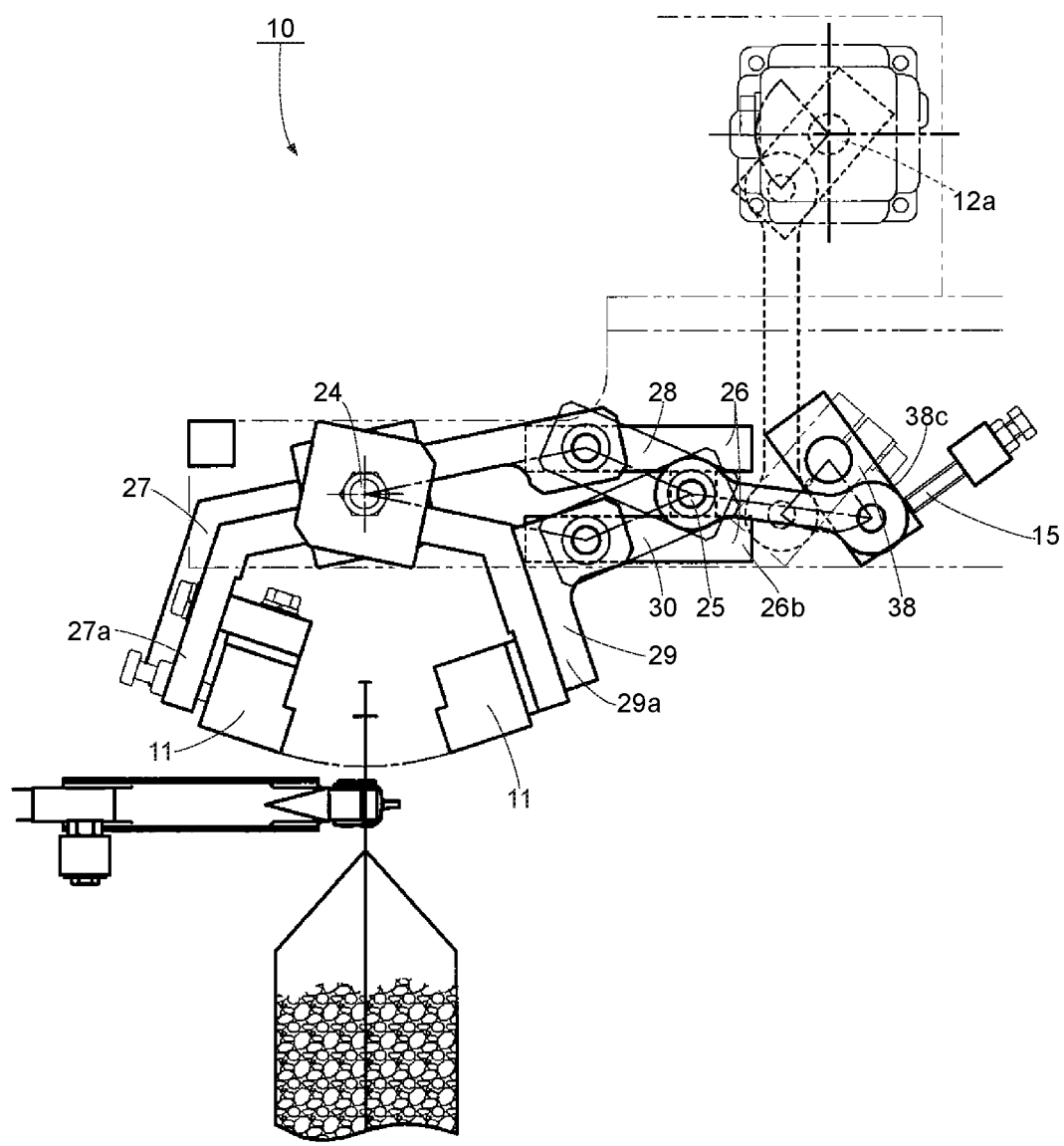
FIG. 3 is a schematic side elevation of the sealing device, illustrating the construction of the device in the case where heater bars are open.
Figure 7:
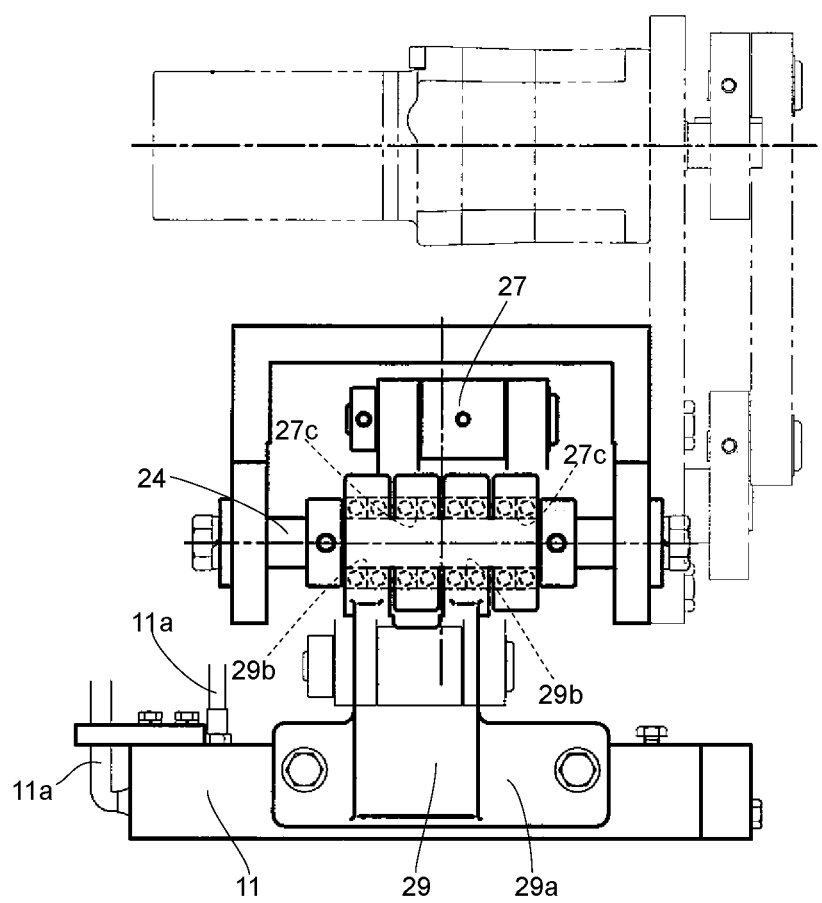
FIG. 7 is an exploded side elevation of the sealing device, taken along line C-C in FIG. 4.
Figure 8:
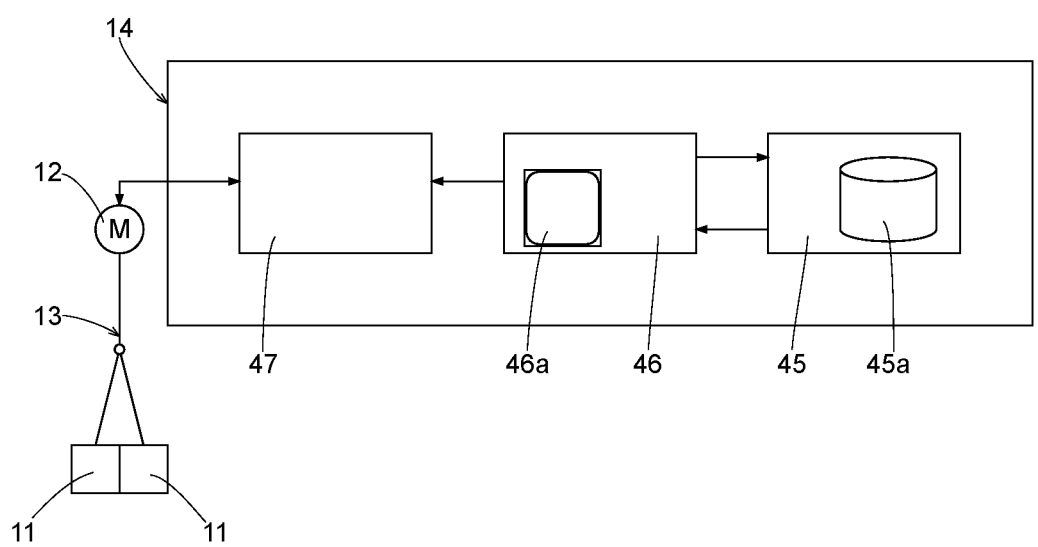
FIG. 8 is a schematic block diagram illustrating the configuration of a control part of the sealing device.

The sealing device 10 includes a pair of heater bars 11, a servomotor 12, a link mechanism 13 and a control part 14, as illustrated in FIGS. 2 and 3. The heater bars 11 comprise a pair of bars opposed to each other so as to be openable/closable and capable of holding the packaging bag therebetween when closed. Electric heaters are built in the bars respectively. Electrical cables 11a are connected to the heater bars 11 respectively as illustrated in FIG. 7. The heater bars 11 are configured to be set at an optimum temperature according to a type of the packaging bag. When the packaging bag gripped by grips 3 is located between the heater bars 11, the heater bars 11 hold therebetween a predetermined part of the packaging bag in a vicinity of a bag mouth of the packaging bag while applying a predetermined pressure to the part, thereby being capable of heat-sealing the packaging bag. The predetermined pressure will be referred to as "sealing pressure" and a time period from start to end of the heat-seal will be referred to as "sealing time period." The vicinity of the bag mouth of the packaging bag is held between the paired heater bars which are warmed to reach a predetermined temperature according to a type of the packaging bag. More specifically, the vicinity of the bag mouth of the packaging bag is held between the heater bars at an optimum sealing pressure for an optimum sealing time period, with the result that the vicinity of the bag mouth of the packaging bag can be prevented from defective heat-sealing such as the burning.

The servomotor 12 has an output shaft 12a rotatable in the forward/backward direction and a reducer 12b. The reducer 12b includes at least a first gear brought into mesh engagement with a rotating shaft 12c of the servomotor 12 and a final gear brought into mesh engagement with the output shaft 12a. As a result, a rotating speed of the rotating shaft 12c in the forward/backward direction is reduced at a predetermined reduction ratio, so that the output shaft 12a can be rotated. The rotating drive force of the rotating shaft 12c can be delivered from the output shaft 12a.

When the heater bars 11 are closed, an angle of the output shaft 12a corresponding to the closure of the heater bars 11 will hereinafter be referred to as "closing angle." When the heater bars 11 are opened, an angle of the output shaft 12a corresponding to the opening of the heater bars 11 will hereinafter be referred to as "opening angle." The closing angle is set to be zero when side surfaces of the heater bars 11 opposed to each other abut against each other without holding the packaging bag therebetween. When the heater bars 11 hold the packaging bag therebetween to heat-seal the heater bars 11, the closing angle is not zero but is larger by a thickness of the packaging bag. The output shaft 12a is rotated so as to approximate to the closing angle of zero, whereby the pressure can be applied to the packaging bag between the heater bars 11.

Alternatively, the closing angle may be adjusted according to the thickness of the packaging bag so as to be zero every time the packaging bag is held between the heater bars 11. In this case, the closing angle is set at a negative value such as $-1°$, $-2°$ and the like. As a result, pressure can be applied to the packaging bag between the heater bars 11 when the output shaft 12a is rotated so as to approximate to a predetermined closing angle. Thus, the output shaft 12a is controlled so as to be rotated by the predetermined closing angle, so that the sealing pressure can be controlled in the case where the packaging bag is held between the heater bars 11.

On the other hand, as illustrated in FIG. 3, the heater bars 11 are configured to be opened to the maximum when a side 38c of a third drive lever 38 which will be described later abuts against a stopper 15. When the heater bars 11 are open to the maximum, an angle of the output shaft 12a corresponding to the maximum open state of the heater bars 11 will be referred to as "maximum opening angle." The maximum opening angle equals an angle in the case where the opening of the heater bars 11 is limited by the stopper 15 when the heater bars 11 are opened by malfunction or accident. In the embodiment, the maximum opening angle is set to 10°.

The opening angle is set so as to be smaller than the above-mentioned maximum opening angle. As a result, the side 38c of the third drive lever 38 can be prevented from colliding with the stopper 15. The opening angle is set to 9° in the embodiment. Thus, the servomotor 12 can periodically open/close the heater bars 11 via the link mechanism 13 when the output shaft 12a is rotated intermittently in the forward/backward direction in a range between a predetermined opening angle and the predetermined closing angle according to a predetermined sealing pressure.

The link mechanism 13 is configured to connect the heater bars 11 and the servomotor 12 to each other and to convert rotation of the output shaft 12a to the opening/closing operation of the heater bars 11. The link mechanism 13 includes a toggle clip 20 and a link unit 21. The link unit 21 connects the output shaft 12a and the toggle clip 20 to each other. The toggle clip 20 includes a first clip 22 having one of the heater bars 11, a second clip 23 having the other heater bar 11, a clip shaft 24 rotatably connecting the first and second clips 22 and 23 to each other, a slider 25 connected to the first and second clips 22 and 23 thereby to open/close the toggle clip 20, and a slider guide 26.

The first clip 22 includes a first seal lever 27 and a first clip rod 28. The first seal lever 27 has two ends to one of which one of the heater bars 11 is fixed. The first seal lever 27 also has a middle part formed with a first clip shaft hole 27c into which the clip shaft 24 is fittable. The first seal lever 27 further has the other end 27b to which one end 28a of the first clip rod 28 is rotatably connected. The first clip rod 28 has the other end formed with a first slider shaft hole 28b which engages the slider 25.

The second clip 23 includes a second seal lever 29 and a second clip rod 30. The second seal lever 29 has two ends to one 29a of which the other heater bar 11 is fixed and the other of which is formed with a second clip shaft hole 29b into which the clip shaft 24 is fittable. The second seal lever 29 also has a middle part 29a to which one end 30a of a second clip rod 30 is rotatably connected. The second clip rod 30 also has the other end formed with a second slider shaft hole 30b which engages the slider 25.

The clip shaft 24 is fitted into a through hole formed by overlapping the first and second clip shaft holes 27c and 29b, thereby rotatably connecting the first and second seal levers 27 and 29 to each other. As a result, the first and second seal levers 22 and 23 are rotatable about the clip shaft 24.

The slider 25 is fitted into a through hole formed by overlapping the first and second slider shaft holes 28b and 30b, thereby connecting the first and second clip rods 28 and 30 to each other. Furthermore, the slider 25 is connected to the link unit 21. Two slider guides 26 are opposed to each other with the slider 25 being located therebetween. As a result, the slider 25 is slidable along the slider guides 26.

When the slider 25 is located at one end 26b side of the slider guide 26, the toggle clip 20 is closed so that the heater bars 11 hold the packaging bag therebetween, as illustrated in FIG. 2. In more detail, when slid to the one end 26a side of the slider guide 26, the slider 25 pushes the first and second clip rods 28 and 30 outward, so that the first and second clip rods 28 and 30 are rotated about the first and second slide shaft holes 28b and 30b respectively. As a result, the first clip rod 28 to which the first seal lever 27 is connected pushes the other end 27b of the first seal lever 27 upward, and the second seal lever 30 to which the second seal lever 29 is connected pushes the middle part 29c of the second seal lever 29 downward. One end 27a of the first seal lever 27 and one end 29a of the second seal lever 29 come close to each other, so that the heater bars 11 are closed.

On the other hand, when the slider 25 is located at the other end 26b side of the slider guide 26, the toggle clip 20 is opened with the result that the heater bars 11 are opened, as illustrated in FIG. 3. In more detail, when the slider 25 is slid to the other end 26b side of the slider guide 26, the slider 25 pulls the first and second clip rods 28 and 30, whereby the first and second clip rods 28 and 30 are rotated about the first and second slide shaft holes 28b and 30b respectively. As a result, the other end 27b of the first seal lever 27 connected to the first clip rod 28 is lowered by the first clip rod 28, and the middle part 29c of the second seal lever 29 connected to the second clip rod 30 is raised by the second clip rod 30. The one end 27a of the first seal lever 27 and the one end 29a of the second seal lever 29 are caused to depart from each other, whereby the heater bars 11 are opened.

Thus, the toggle clip 20 is configured to be opened/closed when the slider 25 is reciprocated along the slider guides 26. The slider 25, the first seal lever 27, the first clip rod 28 and the like or the slider 25, the second seal lever 29, the second clip rod 30 and the like constitute a toggle mechanism in which forces applied to the respective first and second seal levers 27 and 29 are increased when the slider 25 is moved. As a result, the heater bars 11 can be closed with a great force even when the force moving the slider 25 is small. Furthermore, when the output shaft 12a is rotated so as to approximate to the predetermined closing angle, the toggle mechanism generates a repulsive force in the entire toggle clip 20 as well as between the heater bars 11 since the heater bars 11 holding the vicinity of the bag mouth of the packaging bag therebetween are not closed completely. The repulsive force flexes the toggle clip 20, in particular, the first and second seal levers 27 and 29. The flexure is restored by an elastic force, and force due to the elastic force is further applied to the heater bars 11.

The link unit 21 connects the slider 25 of the toggle clip 20 and the output shaft 12a of the servomotor 12 to each other and is configured to convert rotation of the output shaft 12a to a reciprocal motion of the slider 25. The link unit 21 includes a first drive lever 35, a first connecting rod 36, a second drive lever 37, a third drive lever 38 and a second connecting rod 39 sequentially as viewed from the output shaft 12a side.

Figure 4:
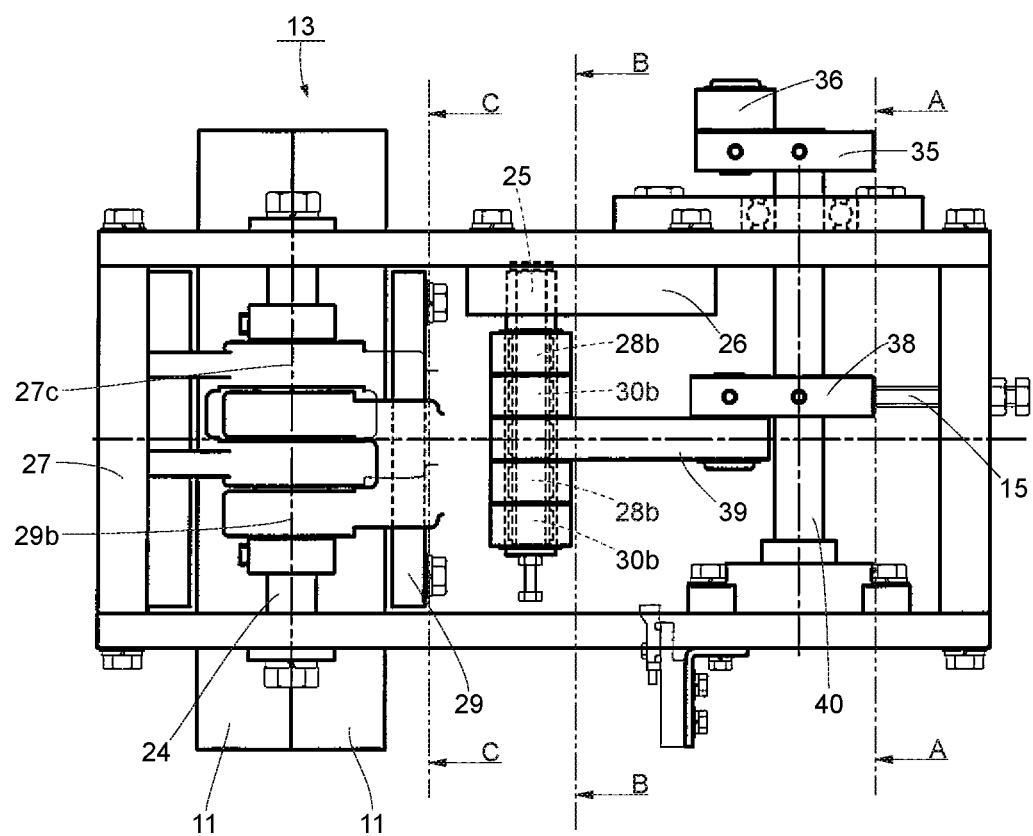
FIG. 4 is a schematic plan view of the sealing device.
Figure 5:
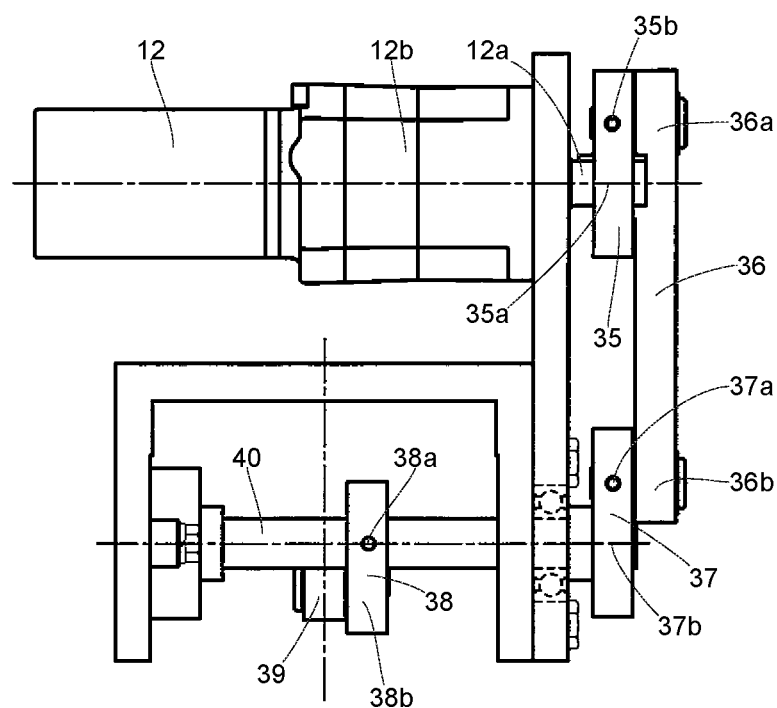
FIG. 5 is an exploded side elevation of the sealing device, taken along line A-A in FIG. 4.
Figure 6:
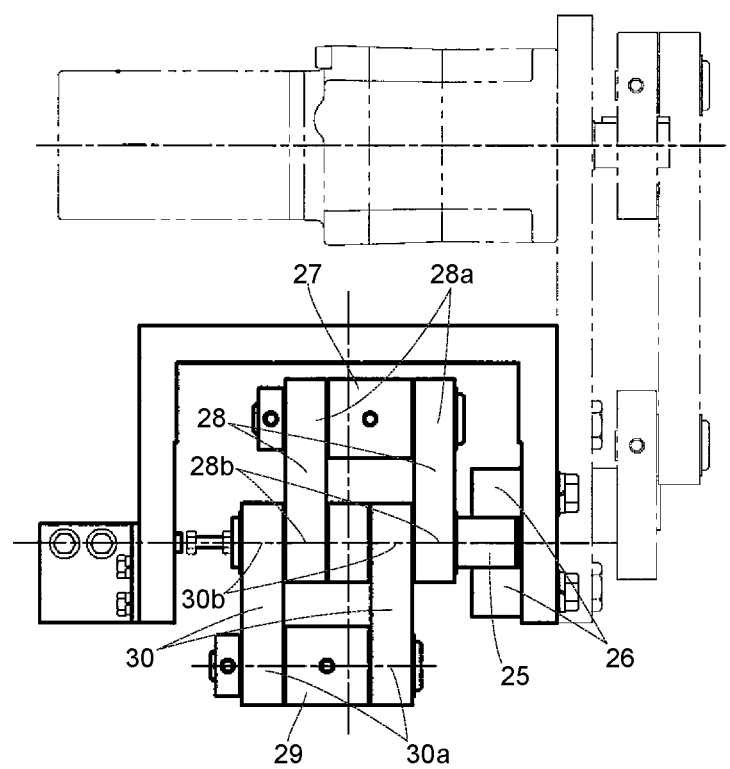
FIG. 6 is an exploded side elevation of the sealing device, taken along line B-B in FIG. 4.

The first drive lever 35 has two ends one 35a of which is fixed to the output shaft 12a and the other 35b of which is rotatably connected to the first connecting rod 36, as illustrated in FIGS. 4 and 5. As a result, the other end 35b is rotatable according to rotation of the output shaft 12a. The first connecting rod 36 has two ends one 36a of which is rotatably connected to the other end 35b of the first drive lever 35 and the other 36b of which is connected to the second drive lever 37. As a result, the second drive lever 37 is operable according to rotation of the first drive lever 35.

The second drive lever 37 has two ends one 37a of which is rotatably connected to the other end 36b of the first connecting rod 36 and the other 37b of which is fixed to a rotatable drive shaft 40. As a result, when the one end 37b is rotated according to an up-down motion of the first connecting rod 36, the second drive lever 37 rotates the drive shaft 40. The third drive lever 38 has two ends one 38a of which is fixed to the drive shaft 40 and the other 38b of which is rotatably connected to the second connecting rod 39. Furthermore, the third drive lever 38 is fixed to the drive shaft 40 in such a manner as to generally form an L-shape together with the second drive lever 37 as illustrated in FIGS. 3 and 4. As a result, the up-down motion of the one end 37a of the second drive lever 37 according to rotation of the first drive lever 35 can be converted to a motion of the other end 38b of the third drive lever 38 in the right-left direction.

The stopper 15 is disposed to be opposed to the side 38c of the third drive lever 38. When the side 38c abuts against the stopper 15, the third drive lever 38 can be prevented from excessive rotation and accordingly, the output shaft 12a of the servomotor 12 can be prevented from rotation in excess of the maximum opening angle.

The second connecting rod 39 has two ends one 39a of which is rotatably connected to the other end 38b of the third drive lever 38 and the other 39b of which is connected to the slider 25. As a result, the motion of the other end 38b of the third drive lever 38 can be converted to reciprocation of the slider 25 along the slider guides 26.

As described above, the link unit 21 connects the output shaft 12a and the slider 25 to each other and converts rotation of the output shaft 12a to reciprocation of the slider 25. Furthermore, the link mechanism 13 comprising the link unit 21 and the toggle clip 20 increases rotative power delivered from the output shaft 12a by the toggle mechanism to transmit the increased rotative power to the heater bars 11, whereby the sealing pressure applied to the vicinity of the bag mouth of the packaging bag can be increased in the case where the packaging bag is held between the heater bars 11.

Furthermore, a control panel 4 is disposed so as to be located by an operator P, and an operation part 5 is located to be easy to operate opposite the operator, as illustrated in FIG. 1. The control panel 4 has a control part 14 which includes a hard disk drive, a storage unit 45 such as a flash memory or similar storage medium 45a, a selection unit 46 which selects a predetermined one of data stored in the storage unit 45, and a control unit 47 which controls the servomotor 12 based on the data selected by the selection unit 46. The operation section 5 has a monitor screen (not illustrated) having an input device 46a comprising a touch panel. A keyboard, push buttons, dial or a similar input device may be provided, instead of the touch panel. The predetermined data is selectable by the selection unit 46.

The storage unit 45 is configured to store a plurality of seal patterns in the storage medium 45a, which seal patterns are set for respective types of packaging bags. Each seal data is composed of data of sealing pressure applied to the vicinity of the bag mouth of the packaging bag when the heater bars 11 hold the vicinity of the bag mouth therebetween and data of sealing time period for which the heater bars 11 hold the vicinity of the bag mouth of the packaging bag from start to end of a heat-sealing step.

The type of the packaging bag includes a material of sheet formed into the packaging bag and a thickness of the sheet. When the sheet is thin and easily meltable, the sealing pressure is lowered and the sealing time period is reduced. When the sheet is thick and is hard to melt, the sealing pressure is increased and the sealing time period is increased, too. Thus, there are optimum sealing pressure values according to respective types of the packaging bags, and there are optimum sealing time periods according to respective types of the packaging bags. The values of optimum sealing pressure and optimum sealing time period are combined into a seal pattern.

The selection unit 46 is configured to be capable of selecting one of a plurality of seal patterns stored in the storage unit 45 by the input device 46a. The selection unit 46 is further configured to deliver to the control unit 47 data of sealing pressure and data of sealing time period of the selected seal pattern. When one of the seal patterns is selected, a sealing device can quickly be set according to the type of the packaging bag. Furthermore, uniform data can be delivered according to a type of the packaging bag. This can prevent variations in the sealing pressure and sealing time period for every device due to operators' knacks in installation of the sealing device or a maintenance work. Thus, the setting of the sealing device can be carried out without professional engineers.

The control unit 47 is configured to control the sealing device based on data of sealing pressure and data of sealing time period of the seal pattern input from the selection unit 46. More specifically, the output shaft 12a is rotated by a predetermined angle according to the predetermined sealing pressure of the seal pattern, so that the heater bars 11 are closed. Furthermore, the output shaft 12a rotated by the predetermined angle is maintained for the sealing time period, so that the heater bars 11 are maintained in the closed state. As a result, the heater bars 11 can hold the vicinity of the bag mouth of the packaging bag therebetween thereby to heat-seal the parts.

Each seal pattern includes parameters of an opening angle in the case where the heater bars 11 are open, a closing angle in the case where the heater bars 11 are closed and a maximum opening angle referring to an angle of the output shaft 12a in the case where the third drive lever 38 is abutting against the stopper 15, that is, an angle of the output shaft 12a when the first drive lever 35 is rotated via the first connecting rod 36 to the lowermost. The output shaft 12a is rotated in a range from the opening angle to the closing angle so that the heater bars 11 are opened/closed in the predetermined seal pattern. The sealing pressure and the sealing time period are adjustable by rotating the output shaft 12a substantially by the closing angle and then maintaining the output shaft 12a for the predetermined time period when the output shaft 12a is rotated by the predetermined closing angle and the heater bars 11 hold the vicinity of the bag mouth of the packaging bag. Rotation of the output shaft 12a by the predetermined closing angle after rotation by the predetermined opening angle is referred to as backward rotation. In the embodiment, the maximum opening angle is set to 10°, the opening angle is set to 9° and the closing angle is set to 0°. However, these angles may be set to respective any values.

A repulsive force against the pressure due to the predetermined sealing pressure is generated in each of the first and second clips 21 and 22 of the toggle clip 20 when the heater bars 11 cause a defective biting. In this case, the control unit 47 has a difficulty in rotating the output shaft 12a by a predetermined angle according to a predetermined sealing pressure, and an apparent sealing pressure is increased. On the other hand, based on a general transient response characteristics of the servomotor 12, there is a case where force applied to each heater bar 11 in a transient state quickly becomes larger than a sealing pressure in the steady state when the output shaft is rotated backward. Thus, there is a possibility that the force quickly increased in the transient state would erroneously be recognized as a rise of the sealing pressure due to defective biting.

In view of the above-described problem, the parameter of closing angle in relation to the sealing pressure is provided with an allowable range allowing a quick rise of sealing pressure. When the sealing pressure deviates from the allowable range, it is determined that defective biting has occurred between the heater bars 11. In this case, the servomotor 12 is controlled to cancel the sealing operation of the heater bars 11. The allowable ranges of sealing pressure are provided according to types of the packaging bags respectively. For example, when the packaging bag is made of a remarkably thin sheet, a target value of closing angle may be set to 0° and an allowable range may be set to range from −0.5° to 0°. When the packaging bag is made of a thick sheet, a target value of closing angle may be set to 1° and an allowable range may be set to range from 0.5° to 1°. The target value and the allowable range of sealing pressure are quickly changed with change in the seal pattern. As a result, the packaging bags can be heat-sealed with the corresponding sealing pressure at once even when the type of the packaging bag is changed.

Figure 9:
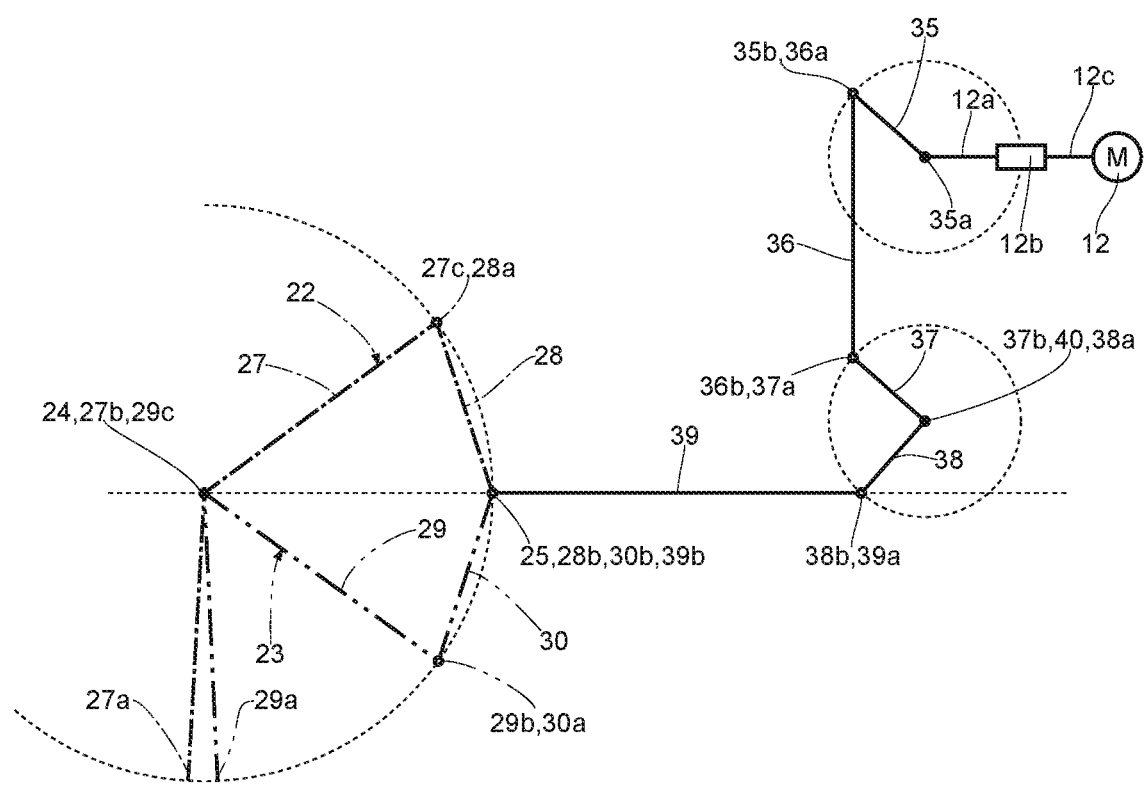
FIG. 9 is a schematic diagrammatic view of a link mechanism of the sealing device to explain an operation of the link mechanism.
Figure 10:
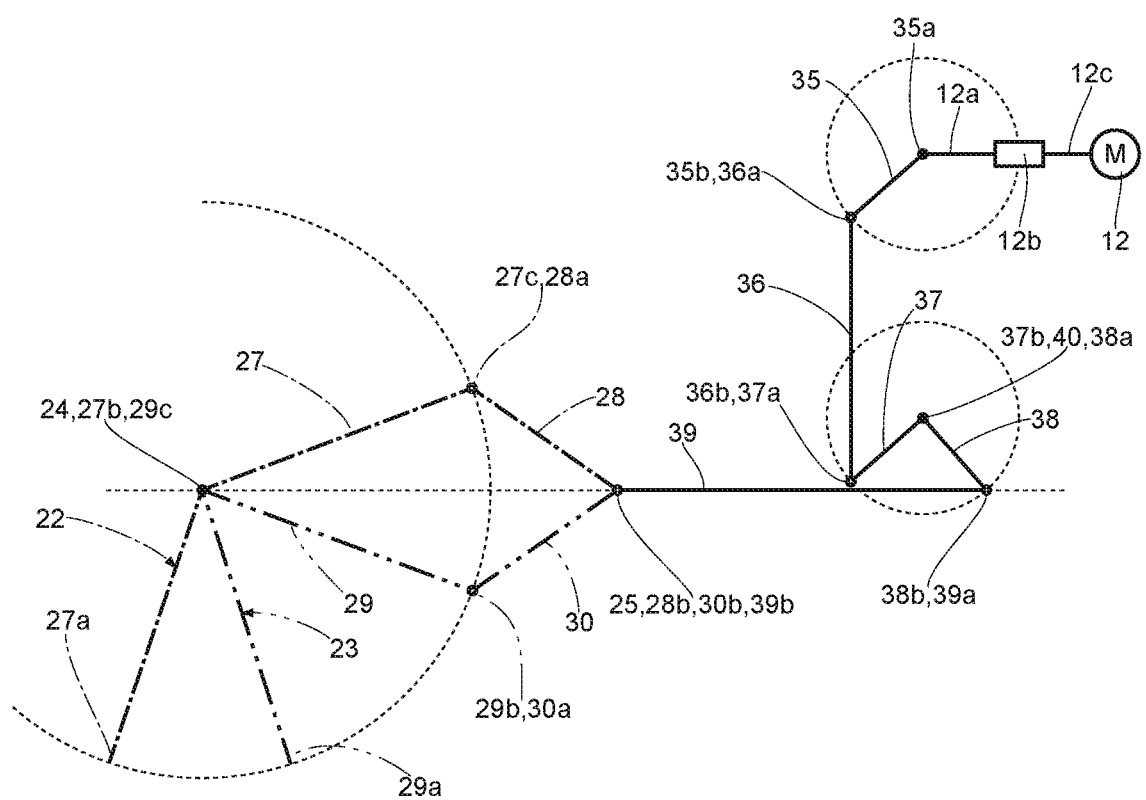
FIG. 10 is also a schematic diagrammatic view of the link mechanism of the sealing device to explain an operation of the link mechanism.
Figure 11:
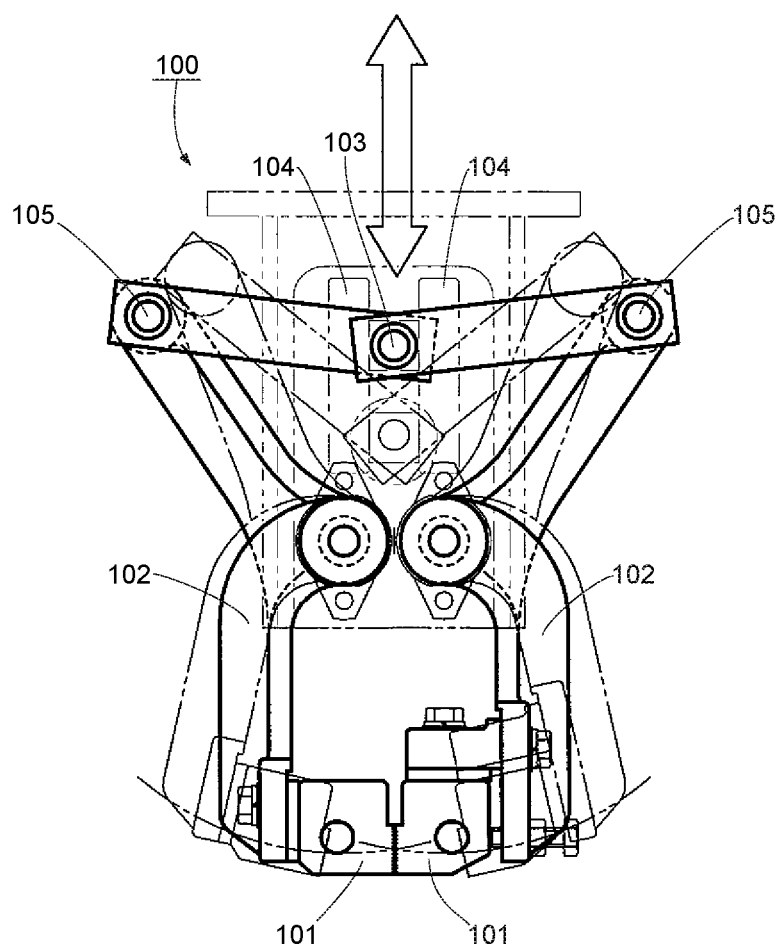
FIG. 11 is a schematic side elevation of a conventional sealing device, illustrating the construction thereof.

In the sealing device 10 configured as described above, rotation of the output shaft 12a of the servomotor 12 is transmitted to the heater bars 11 in the following manner. The opening/closing operation of the heater bars 11 will now be described with reference to the accompanying drawings. FIG. 9 explains the state of the link mechanism 13 in the case where the heater bars 11 are closed. FIG. 10 explains the state of the link mechanism 13 in the case where the heater bars 11 are open.

The servomotor 12 is configured so that output of the rotating shaft 12c rotated at a predetermined speed is reduced by the reducer 12b so as to correspond to another predetermined speed and the reduced output is delivered from the output shaft 12a. A rotating angle of the output shaft 12a is controlled by the control unit 47. The control unit 47 further controls the output shaft 12a so that the output shaft 12a is rotated from a predetermined opening angle to a predetermined closing angle, based on data of the predetermined sealing pressure of the seal pattern input from the selection unit 46. In this case, the link mechanism 13 is operated in the following manner. The link unit 21 causes the slider 25 to slide from a predetermined position at the other end 26b side of the slider guides 26 toward another predetermined position at the one end 26a side when the output shaft 12a is rotated in the backward direction from a predetermined opening angle to a predetermined closing angle corresponding to a predetermined sealing pressure.

In more detail, the first connecting rod 36 raised upward by the first drive lever 35 fixed to the output shaft 12a rotates the second and third drive levers 37 and 38 about the drive shaft 40, so that the third drive lever 38 pushes the second connecting rod 39 outward, which second connecting rod 39 causes the slider 25 to slide along the slider guides 26 from the predetermined position at the other end 26b side to the predetermined position at the one end 26a side. When the slider 25 is slid to the predetermined position at the one end 26a side, the first and second clips 22 and 23 of the toggle clip 20 are rotated about the clip shaft 24 with the result that the distal end of the toggle clip 20 is closed, whereby the heater bars 11 are closed.

In more detail, the slider 25 rotates the first and second clip rods 28 and 30 about the first and second slider shaft holes 28b and 30b in directions opposed to each other, respectively. As a result, the first clip rod 28 pushes the other end 27b of the first seal lever 27 upward, and the second clip rod 30 pushes the middle part 29c of the second seal lever 29 downward. The one end 27a of the first seal lever 27 and the one end 29a of the second seal lever 29 come closer to each other, so that the heater bars 11 are closed. The vicinity of the bag mouth of the packaging bag is held between the heater bars 11 with the predetermined sealing pressure when the heater bars 11 are closed.

After lapse of the predetermined sealing time period, the output shaft 12a is rotated in the forward direction from the predetermined closing angle corresponding to the predetermined sealing pressure to the predetermined opening angle. In this case, the link unit 21 causes the slider 25 to slide from the predetermined position at the one end 26a side of the slider guides 26 toward the predetermined position at the other end 26b side. As a result, the slider 25 rotates the first and second clips 22 and 23 about the clip shaft 24 thereby to open the distal end of the clip shaft 24, so that the heater bars 11 are opened. When the slider 25 reaches the predetermined position at the other end 26b side of the slider guides 26, the first drive lever 35 is returned to an initial position, and the output shaft 12a is returned by the predetermined opening angle.

A torque limiting mechanism may be provided which quickly limits torque applied to the output shaft 12a. For this purpose, the reducer 12b may be provided with a clutch or an automatic return mechanism which quickly returns the rotating shaft 12c of the servomotor 12 to the initial position after lapse of a predetermined sealing time period in the case of forward rotation of the output shaft 12a. Thus, since the sealing pressure is quickly relieved, the heater bars 11 can quickly be opened with the result that the packaging bag can be prevented from being burned. Furthermore, as the result of provision of the torque limiting mechanism as described above, the output shaft 12a can quickly be relieved of torque in the case where the heater bars 11 are overloaded due to the defective biting of the packaging bag or the like when the output shaft 12a is rotated by the predetermined closing angle according to the predetermined sealing pressure, with the result that the link mechanism 13 can be prevented from breakage. Furthermore, when malfunction occurs in another device of the packaging machine 1 or in another step or when the packaging machine 1 urgently stops due to failure of power supply or the like, the heater bars 11 are quickly opened by the torque limiting mechanism so that occurrence of defective products such as a burned packaging bag or an insufficiently sealed packaging bag can be reduced.

In the sealing device 10 of the above-described embodiment, the output shaft 12a of the servomotor 12 is rotated in the forward/backward direction in order that the paired heater bars 11 may be opened/closed. The toggle clip 20 constitutes a toggle mechanism. As a result, since torque applied to the output shaft 12a can be rendered smaller, costs can be reduced by the use of a small-sized lower-power servomotor 12. Furthermore, the output shaft 12a can be rotated at higher speeds forward/backward since the load applied to the servomotor 12 can be rendered smaller. Consequently, the packaging bag can quickly be held between the heater bars 11 and quickly be released after completion of heat sealing with the result that the vicinity of the bag mouth of the packaging bag can be prevented from being burned or defective pressure bonding.

Furthermore, when the heater bars 11 are closed, a servo action of the toggle mechanism produces repulsive forces in the first and second seal levers, which repulsive forces are against the first and second clip rods, respectively. The repulsive forces are transmitted to the one end sides of the first and second seal levers respectively. Accordingly, the elastic forces of the first and second seal levers flexed by the respective repulsive forces are applied to the heater bars as well as the rotative power of the output shaft 12a. The elastic forces become larger as forces of the first and second clip rods spreading the other ends of the respective first and second seal levers are strong. More specifically, the elastic force bears a proportionate relationship to the pressure in relation to the sealing pressure, that is, the predetermined angle of the output shaft 12a. Accordingly, the elastic force can be controlled when the output shaft 12a is controlled to make a predetermined angle according to a predetermined sealing pressure. Output of the servomotor can be reduced by consideration of the elastic force.

According to the sealing device of the embodiment, a simple output applied to the heater bars can be increased by the servo action of the toggle mechanism, and the elastic forces applied to the first and second seal levers can also be added to the heater bars, respectively. As a result, since a servomotor with a small rating capacity can be used, the cost of the servomotor can be reduced, and the sealing device 10 can be operated with energy saving.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A sealing device which is incorporated in a packaging machine filling a packaging bag with articles and which heat-seals a vicinity of a bag mouth of the packaging bag, the sealing device comprising:

a pair of heater bars disposed opposite each other so as to be openable/closable, the heater bars holding the vicinity of the bag mouth of the packaging bag therebetween when closed, thereby heat-sealing the vicinity of the bag mouth of the packaging bag;

a servomotor having an output shaft rotatable in a forward/backward direction;

a link mechanism connecting the servomotor and the heater bars to each other to convert rotation of the output shaft to an opening/closing operation of the heater bars;

a storage unit storing a plurality of seal patterns, each seal pattern including a sealing pressure applied to the vicinity of the bag mouth of the packaging bag when the vicinity of the bag mouth in the packaging bag is held between the heater bars and a sealing time period for which the vicinity of the bag mouth of the packaging bag is continuously held between the heater bars, the seal patterns including different sealing pressures and different sealing time periods for every one of a plurality of types of the packaging bags;

a selection unit configured to select one of the seal patterns stored by the storage unit; and a control unit configured to control so that the output shaft is rotated by a predetermined closing angle according to the predetermined sealing pressure of the seal pattern selected by the selection unit thereby to close the heater bars, and so that the heater bars are maintained in the closed state for the predetermined sealing time period of the selected seal pattern;

wherein the link mechanism includes a toggle clip oppositely disposing the heater bars so that the heater bars are openable/closable and fixing the heater bars and a link unit configured to connect the toggle clip and the output shaft to each other;

wherein the toggle clip includes a first clip portion having one of the heater bars, a second clip portion having the other heater bar, a clip shaft rotatably connecting the first clip portion and the second clip portion to each other, a slider opening/closing the first clip portion and the second clip portion, and a slider guide on which the slider is slidable, the slider guide having two ends;

wherein the first clip portion includes a first seal lever having two ends to one of which the one heater bar is fixed and a first clip rod connecting the first seal lever and the slider to each other;

wherein the second clip portion includes a second seal lever having two ends to one of which the other heater bar is fixed and a second clip rod connecting the second seal lever and the slider to each other;

wherein when the slider is located at the one end side of the slider guide, the slider pushes the first and second seal levers via the respective first and second clip rods to open the first and second seal levers, thereby closing the toggle clip;

wherein when the slider is located at the other end side of the slide guide, the slider pulls the first and second seal levers via the respective first and second clip rods to open the toggle clip, so that a reciprocal motion of the slider is converted to an opening/closing operation of the toggle clip.

2. A sealing device which is incorporated in a packaging machine filling a packaging bag with articles and which heat-seals a vicinity of a bag mouth of the packaging bag, the sealing device comprising:

a pair of heater bars disposed opposite each other so as to be openable/closable, the heater bars holding the vicinity of the bag mouth of the packaging bag therebetween when closed, thereby heat-sealing the vicinity of the bag mouth of the packaging bag;

a servomotor having an output shaft rotatable in a forward/backward direction;

a link mechanism connecting the servomotor and the heater bars to each other to convert rotation of the output shaft to an opening/closing operation of the heater bars;

a storage unit storing a plurality of seal patterns, each seal pattern including a sealing pressure applied to the vicinity of the bag mouth of the packaging bag when the vicinity of the bag mouth in the packaging bag is held between the heater bars and a sealing time period for which the vicinity of the bag mouth of the packaging bag is continuously held between the heater bars, the seal patterns including different sealing pressures and different sealing time periods for every one of a plurality of types of the packaging bags;

a selection unit configured to select one of the seal patterns stored by the storage unit; and a control unit configured to control so that the output shaft is rotated by a predetermined closing angle according to the predetermined sealing pressure of the seal pattern selected by the selection unit thereby to close the heater bars, and so that the heater bars are maintained in the closed state for the predetermined sealing time period of the selected seal pattern, wherein the link unit includes:

a first drive lever having two ends one of which is fixed to the output shaft;

a first connecting rod having two ends one of which is connected to the other end of the first drive lever;

a second drive lever having two ends one of which is connected to the other end of the first connecting rod;

a third drive lever having two ends one of which is coaxially connected to the other end of the second drive lever, the third drive lever being fixed so as to be generally formed into an L-shape together with the second drive lever; and a second connecting rod having two ends one of which is connected to the other end of the third drive lever and the other of which is connected to the slider, wherein the first drive lever rotated according to rotation of the output shaft slides the slider along the slide guide via the first connecting rod, the second drive lever, the third drive lever and the second connecting rod.

* * * * *